United States Patent
Robins et al.

(10) Patent No.: US 10,734,686 B2
(45) Date of Patent: Aug. 4, 2020

(54) SODIUM-ALUMINUM BATTERY WITH SODIUM ION CONDUCTIVE CERAMIC SEPARATOR

(71) Applicant: FIELD UPGRADING USA, INC., Madison, WI (US)

(72) Inventors: Mathew Robins, Saratoga Springs, UT (US); Sai Bhavaraju, West Jordan, UT (US)

(73) Assignee: FIELD UPGRADING USA, INC., Broomfield, CO (US)

( * ) Notice: Subject to any disclaimer, the term of this patent is extended or adjusted under 35 U.S.C. 154(b) by 471 days.

(21) Appl. No.: 15/130,741

(22) Filed: Apr. 15, 2016

(65) Prior Publication Data

US 2016/0308253 A1    Oct. 20, 2016

Related U.S. Application Data (60) Provisional application No. 62/171,695, filed on Jun. 5, 2015, provisional application No. 62/149,234, filed on Apr. 17, 2015.

(51) Int. Cl.
*H01M 10/39* (2006.01)
*H01M 4/58* (2010.01)
(Continued)

(52) U.S. Cl.
CPC ......... *H01M 10/399* (2013.01); *H01M 4/381* (2013.01); *H01M 4/582* (2013.01);
(Continued)

(58) Field of Classification Search
CPC ......... H01M 10/399; H01M 110/0562; H01M 10/0563; H01M 14/582; H01M 14/381;
(Continued)

(56) References Cited

U.S. PATENT DOCUMENTS 3,632,448 A * 1/1972 Beltzer ............... H01M 10/399
                                                429/112
3,847,667 A    11/1974 Werth
(Continued)

FOREIGN PATENT DOCUMENTS

EP    2485317    8/2012
EP    2490293    8/2012
(Continued)

OTHER PUBLICATIONS

Fannin Jr et al J. Electrochem. Soc.—1972—pp. 801-807.*
(Continued)

*Primary Examiner* — Jonathan G Leong
*Assistant Examiner* — Aaron J Greso
(74) *Attorney, Agent, or Firm* — Foley & Lardner LLP (57) ABSTRACT

The present invention provides a sodium-aluminum secondary cell. The cell includes a sodium metal negative electrode, a positive electrode compartment that includes an aluminum positive electrode disposed in a positive electrolyte mixture of $NaAl_2X_7$ and $NaAlX_4$, where X is a halogen atom or mixture of different halogen atoms selected from chlorine, bromine, and iodine, and a sodium ion conductive electrolyte membrane that separates the negative electrode from the positive electrolyte. In such cases, the electrolyte membrane can include any suitable material, including, without limitation, a NaSICON-type membrane. Generally, when the cell functions, both the sodium negative electrode and the positive electrolyte are molten and in contact with the electrolyte membrane. Additionally, the cell is functional at an operating temperature between about 100° C. and about 200° C.

18 Claims, 4 Drawing Sheets

(51) Int. Cl.
*H01M 4/38* (2006.01)
*H01M 10/0562* (2010.01)
*H01M 10/0563* (2010.01)

(52) U.S. Cl.
CPC ... *H01M 10/0562* (2013.01); *H01M 10/0563* (2013.01); *H01M 2300/0068* (2013.01); *H01M 2300/0074* (2013.01)

(58) Field of Classification Search
CPC .. H01M 10/0562; H01M 4/582; H01M 4/381; H01M 2300/0068; H01M 2300/0074; H01M 14/58; H01M 14/38; H01M 4/58; H01M 4/28
See application file for complete search history.

(56) References Cited

U.S. PATENT DOCUMENTS

| | | |
|---|---|---|
| 3,969,138 A | 7/1976 | Werth et al. |
| 4,335,191 A | 6/1982 | Peled |
| 4,891,281 A | 1/1990 | Kuo et al. |
| 4,894,298 A | 1/1990 | Vukson et al. |
| 4,973,534 A | 11/1990 | Adendorff et al. |
| 5,019,466 A | 5/1991 | Coetzer et al. |
| 5,053,294 A | 10/1991 | Sernka et al. |
| 6,007,943 A | 12/1999 | Coetzer |
| 6,187,479 B1 | 2/2001 | Liu |
| 7,632,604 B2 | 12/2009 | Iacovangelo et al. |
| 8,968,902 B2 | 3/2015 | Coors et al. |
| 2002/0192553 A1 | 12/2002 | Barker et al. |
| 2003/0013021 A1 | 1/2003 | Wariishi |
| 2005/0260460 A1 | 11/2005 | Kishi et al. |
| 2006/0141346 A1 | 6/2006 | Gordon et al. |
| 2008/0268327 A1 | 10/2008 | Gordon et al. |
| 2009/0134842 A1 | 5/2009 | Joshi et al. |
| 2010/0279174 A1 | 11/2010 | Young |
| 2010/0297537 A1 | 11/2010 | Coors et al. |
| 2011/0104526 A1 | 5/2011 | Boxley et al. |
| 2011/0104563 A1* | 5/2011 | Galloway .......... H01M 2/0235 429/199 |
| 2011/0199042 A1 | 8/2011 | Abe |
| 2011/0223460 A1 | 9/2011 | Farmer |
| 2012/0021273 A1 | 1/2012 | Ohmori et al. |
| 2012/0129056 A1 | 5/2012 | Majima et al. |
| 2012/0164524 A1 | 6/2012 | Bogdan et al. |
| 2012/0114951 A1 | 8/2012 | Fukunaga et al. |
| 2012/0194140 A1* | 8/2012 | Rijssenbeek .......... H01M 10/42 320/134 |
| 2012/0219833 A1 | 8/2012 | Coors et al. |
| 2012/0315548 A1 | 12/2012 | Fujikawa et al. |
| 2013/0136980 A1* | 5/2013 | Bartling .................. H01M 4/38 429/188 |
| 2014/0065456 A1* | 3/2014 | Bhavaraju ............. H01M 10/36 429/81 |
| 2014/0210422 A1 | 7/2014 | Bhavaraju et al. |
| 2014/0212707 A1 | 7/2014 | Bhavaraju et al. |
| 2015/0056486 A1* | 2/2015 | Ramani ................ H01M 4/381 429/102 |
| 2015/0086826 A1 | 3/2015 | Bhavaraju et al. |
| 2015/0147619 A1* | 5/2015 | Chae ................... H01M 10/399 429/104 |

FOREIGN PATENT DOCUMENTS

| | | |
|---|---|---|
| GB | 2294803 | 8/1996 |
| JP | 08321322 | 12/1996 |
| JP | 2004178991 | 6/2004 |
| JP | 2009009933 | 1/2009 |
| KR | 20100027321 | 3/2010 |
| KR | 20130098236 | 9/2013 |
| WO | WO2010110465 | 9/2010 |
| WO | WO2010135283 | 11/2010 |
| WO | WO2011104805 | 9/2011 |
| WO | WO2011111566 | 9/2011 |
| WO | WO2012115786 | 8/2012 |
| WO | WO2012117916 | 9/2012 |
| WO | WO2012132813 | 10/2012 |

OTHER PUBLICATIONS

Berg et al. Inorganic Chemistry vol. 23 pp. 557-565, 1984.*
Fannin et al. [Fannin] (J. Chem. Eng. Data 1982, 27, 114-119).*
Barcena, Carlos , "Non Final Office Action", U.S. Appl. No. 14/292,130, dated Dec. 8, 2015, 1-9.
Barcena, Carlos , "Notice of Allowance", U.S. Appl. No. 14/292,130, dated May 5, 2016, 1-13.
Bito, et al., "Bibliographical Data and Abstract of JP2004178991", Japanese Published Patent Application JP 2004178991, Jun. 24, 2004, 1.
Carrico, Robert S. , "Non Final Office Action", U.S. Appl. No. 14/205,772, dated Jul. 5, 2016, 1-21.
Carrico, Robert S. , "Non Final Office Action", U.S. Appl. No. 14/205,019, dated Jul. 15, 2016, 1-22.
Carrico, Robert S. , "Non-Final Office Action", U.S. Appl. No. 13/290,716, dated Jul. 22, 2014, 1-15.
Carrico, Robert S. , "Notice of Allowance", U.S. Appl. No. 13/290,716, dated Oct. 29, 2014, 1-8.
Cho, Han S. , "International Search Report", PCT Application No. PCT/US14/57462 (Corresponding to U.S. Appl. No. 14/496,509), dated Jan. 9, 2015, 1-3.
Cho, Han S. , "Written Opinion of the International Searching Authority", PCT Application No. PCT/US14/57462 (Corresponding to U.S. Appl. No. 14/496,509), dated Jan. 9, 2015, 1-4.
Cho, Ki Y. , "Written Opinion of the International Searching Authority", PCT application US2011/059624 (Corresponding to U.S. Appl. No. 13/290,716), dated May 22, 2012, 1-3.
Cho, Ki Y. , "International Search Report", PCT application US2011/059624 (Corresponding to U.S. Appl. No. 13/290,716), dated May 22, 2012, 1-3.
Choi, Sang W. , "International Search Report", PCT Application No. PCT/US2014/0423698 (Corresponding to U.S. Appl. No. 14/205,019), dated Jul. 29, 2014, 1-3.
Choi, Sang W. , "Written Opinion of the International Searching Authority", PCT Application No. PCT/US2014/0423698 (Corresponding to U.S. Appl. No. 14/205,019), dated Jul. 29, 2014, 1-6.
Eoff, Anca , "Final Office Action", U.S. Appl. No. 14/298,302, dated May 9, 2016, 1-17.
Eoff, Anca , "Non-Final Office Action", U.S. Appl. No. 14/298,302, dated Nov. 18, 2015, 1-19.
Fujikawa, , "English Bibliographic Data: WO2011104805", Sep. 1, 2011.
Hueso, et al., "High Temperature Sodium Batteries: Status, challenges and future trends", Energy & Environmental Science, 2013, 6, 734-749, Jan. 14, 2013, 734-749.
Ito, et al., "English Bibliographic Data: WO2012132813", Oct. 4, 2012.
Jarvi, Tommi , "European Search Report", European Patent Application No. EP14808453, dated Dec. 1, 2016, 1-12.
Kim, et al., "The Role of Additives in the Electroreduction of Sodium Ions in Chloroaluminate-Based Ionic Liquids", Journal of the Electrochemical Society, 2005, vol. 152, No. 1, pp. E9-E13, Dec. 1, 2004, E9-E13.
Lang, et al., "Catalytic additives for the reversible reduction of sodium in chloroaluminate ionic liquids", Electrochimica Acta, 2006, vol. 51, Iss. 19, pp. 3884-3889, Dec. 27, 2005, 3884-3889.
Lee, Dong W. , "International Search Report", PCT Application No. PCT/US16/27930 (Corresponding to U.S. Appl. No. 15/130,741), dated Jul. 26, 2016, 1-3.
Lee, Dong W. , "Written Opinion of the International Searching Authority", PCT Application No. PCT/US16/27930 (Corresponding to U.S. Appl. No. 15/130,741), dated Jul. 26, 2016, 1-5.
Li, et al., "Rechargeable Ni—Li Battery Integrated Aqueous/Non Aqueous System", Energy Technology Research Institute, National Institute of Advanced Industrial Science and Technology, Oct. 5, 2009, 15098-15099.

(56) References Cited

OTHER PUBLICATIONS

Majima, et al., "English Bibliographic Data: WO2011111566", Sep. 15, 2011.
Motohiro, Fukuhara, "English Language Abstract", KR20100027321, Mar. 11, 2010, 1.
Muralidar, Richard V., "Notice of Allowance", U.S. Appl. No. 14/478,676, dated May 9, 2016, 1-15.
"English Bibliographic Data: WO2012117916", Sep. 7, 2012.
Ohmori, et al., "English Bibliographic Data: WO2010110465", Sep. 30, 2010.
Shin, Ju C., "International Search Report", PCT Application No. PCT/US2014/024066 (Corresponding to U.S. Appl. No. 14/205,772), dated Jun. 27, 2014, 1-3.
Shin, Ju C., "International Search Report", PCT Application No. PCT/US2014/40297 (Corresponding to U.S. Appl. No. 14/292,130), dated Sep. 25, 2014, 1-3.
Shin, Ju C., "International Search Report", PCT Application No. PCT/US14/41329 (Corresponding to U.S. Appl. No. 14/298,302), dated Oct. 2, 2014, 1-3.
Shin, Ju C., "International Search Report", PCT Application No. PCT/US2014/054339 (Corresponding to U.S. Appl. No. 14/478,676), dated Dec. 15, 2014, 1-3.
Shin, Ju C., "Written Opinion of the International Searching Authority", PCT Application No. PCT/US2014/054339 (Corresponding to U.S. Appl. No. 14/478,676), dated Dec. 15, 2014, 1-3.
Shin, Ju C., "Written Opinion of the International Searching Authority", PCT Application No. PCT/US2014/024066 (Corresponding to U.S. Appl. No. 14/205,772), dated Jun. 27, 2014, 1-6.
Shin, Ju C., "Written Opinion of the International Searching Authority", PCT Application No. PCT/US2014/40297 (Corresponding to U.S. Appl. No. 14/292,130), dated Sep. 25, 2014, 1-6.
Shin, Ju C., "Written Opinion of the International Searching Authority", PCT Application No. PCT/US14/41329 (Corresponding to U.S. Appl. No. 14/298,302), dated Oct. 2, 2014, 1-6.
Shozo, Fujiwara, "English Language Abstract", JP2009009933, Jan. 15, 2009, 1.
Soo, et al., "English Language Abstract", KR20130098236, Sep. 4, 2013, 1.
Steinreiber, J., "European Search Report", European Patent Application No. 14779822.7, dated Sep. 1, 2016, 1-10.
Steinreiber, J., "European Search Report", European Patent Application No. 14744153.2, dated Sep. 1, 2016, 1-12.
Sudworth, J.L., "The sodium/nickel chloride (ZEBRA) battery", Journal of Power Sources 100 (2001) 149-163, Jan. 1, 2001, 149-163.
Totsuka, Kazuhide, "Patent Abstracts of Japan (JP 08-321322)", English Language Abstract of Japanese patent publication JP JP 08-321322, Dec. 3, 1996, 1.
Vij, , "Cobalt (II) and Nickel (II) Bis (fluorosulphuryl) preparation and characterization", Bulletin De La Societe Chimique De France, Societe Francaise De Chime. Paris, France. vol. 3, Jan. 1, 1989 (Jan. 1, 1989), pp. 331-333, Jan. 1, 1989, 1-3.
Walls, Cynthia K., "Notice of Allowance", U.S. Appl. No. 14/496,509, dated Aug. 24, 2016, 1-15.
Wang, et al., "Room temperature Na/S batteries with sulfur composite Cathode Material", Electrochemistry Communications 9 (2007), Elsevier, Jun. 18, 2006, 31-34.
Yuki, Saori, "Japanese Office Action", Japanese App No. JP2013-537914, dated Sep. 8, 2015, 1-8.
Carrico, Robert S., "Final Office Action", U.S. Appl. No. 14/205,772, dated Feb. 9, 2017, 1-15.
Carriod, Robert S., "Final Office Action", U.S. Appl. No. 14/205,019, dated Jan. 26, 2017, 1-21.
Eoff, Anca, "Non-Final Office Action", U.S. Appl. No. 14/298,302, dated Apr. 6, 2017, 1-13.
Trémillon, B. Chemistry in Non-Aqueous Solvents. D. Reidel Publishing Company, 1974, pp. 147-148.
Extended European Search Report for EP16780924.3 dated Oct. 11, 2018 (10 pages).
Fannin et al; Chloroaluminate Equilibria in Al Cl3—NaCl Melts, Journal of the Electrochemical Society, vol. 119, No. 7, Jul. 5, 1972, pp. 801-807.

\* cited by examiner

SODIUM-ALUMINUM BATTERY WITH SODIUM ION CONDUCTIVE CERAMIC SEPARATOR

CROSS-REFERENCE TO RELATED APPLICATION

This application claims the benefit of U.S. Provisional Application No. 62/149,234, filed Apr. 17, 2015, entitled "SODIUM-ALUMINUM BATTERY WITH NASICON ceramic separator" and the benefit of U.S. Provisional Application No. 62/171,695, filed Jun. 5, 2015, entitled "SODIUM-ALUMINUM BATTERY WITH sodium ion CONDUCTIVE CERAMIC SEPARATOR." The referenced provisional patent applications are hereby incorporated by reference.

FIELD OF THE INVENTION

The present invention relates in general to batteries. More particularly, the present invention provides a sodium-aluminum based secondary cell (or rechargeable battery) with a sodium ion conductive ceramic electrolyte separator that operates at a temperature between about 100° Celsius ("C") and about 200° C. The disclosed invention includes systems and methods for providing battery charge transfer mechanisms that allow metal plating to form on a battery's positive electrode as the battery discharges, and that also allow the metal plating to go into solution as the battery charges.

BACKGROUND OF THE INVENTION

Electrolytic cells comprising a solid sodium ion conductive electrolyte membrane that selectively transports sodium ions are known in the art. By having a sodium ion-selective membrane in the electrolytic cell, sodium ions are allowed to pass between the cell's negative electrode compartment and positive electrode compartment while other chemicals are maintained in their original compartments. Thus, through the use of a sodium ion-specific membrane, an electrolytic cell can be engineered to be more efficient and to produce different chemical reactions than would otherwise occur without the membrane.

Solid sodium ion conductive electrolyte membranes are used in electrochemical cells for various reasons, including, but not limited to, being: ion conductive, ion selective, water impermeable, chemically stable, electronically insulative, and so forth. By way of example, NaSICON (Na Super Ion CONducting) membranes selectively transport sodium cations. Other examples of solid sodium ion conductive electrolyte membranes include beta alumina, sodium-conductive glasses, etc.

Electrolytic cells comprising solid sodium ion conductive membranes are used to produce a variety of different chemicals and to perform various chemical processes. In some cases, however, such cells are used as batteries that can store and release electrical energy for a variety of uses. In order to produce electrical energy, batteries typically convert chemical energy directly into electrical energy. Generally, a single battery includes one or more galvanic cells, wherein each of the cells is made of two half-cells that are electrically isolated except through an external circuit. During discharge, electrochemical reduction occurs at the cell's positive electrode, while electrochemical oxidation occurs at the cell's negative electrode. While the positive electrode and the negative electrode in the cell do not physically touch each other, they are generally chemically connected by at least one (or more) ionically conductive and electrically insulative electrolyte(s), which can either be in a solid or a liquid state, or in combination. When an external circuit, or a load, is connected to a terminal that is connected to the negative electrode and to a terminal that is connected to the positive electrode, the battery drives electrons through the external circuit, while ions migrate through the electrolyte.

Batteries can be classified in a variety of manners. For example, batteries that are completely discharged only once are often referred to as primary batteries or primary cells. In contrast, batteries that can be discharged and recharged more than once are often referred to as secondary batteries or secondary cells. The ability of a cell or battery to be charged and discharged multiple times depends on the Faradaic efficiency of each charge and discharge cycle.

Rechargeable batteries based on sodium can employ a solid primary electrolyte separator, such as a solid sodium ion conductive electrolyte membrane (discussed above). The principal advantage of using a solid sodium ion conductive electrolyte membrane is that the Faradaic efficiency of the resulting cell approaches 100%. Indeed, in many other cell designs, the electrode solutions in the cell are able to intermix over time and, thereby, cause a drop in Faradaic efficiency and loss of battery capacity.

In some cases, the sodium negative electrode in sodium-based rechargeable batteries is molten. In such cases, the batteries may need to be operated at temperatures above about 100° C., the melting point of sodium. Furthermore, some conventional sodium-based batteries comprise a positive electrode change transfer mechanism using a solution (e.g., NaOH) that has a relatively high pH or that is otherwise chemically reactive to the sodium ion conductive electrolyte membrane. As a result of the high operating temperatures and the chemically reactive positive electrolyte solutions, the solid sodium ion conductive electrolyte membrane of some conventional sodium-based batteries is relatively susceptible to degradation by dissolution. Accordingly, the useful life of such batteries may be relatively short.

Thus, while sodium-based rechargeable batteries are known, challenges still exist, including those mentioned above. Accordingly, it would be an improvement in the art to augment or even replace certain conventional sodium-based rechargeable cells with other battery charge transfer mechanisms.

BRIEF SUMMARY OF THE INVENTION

The present invention provides systems and methods for providing battery charge transfer mechanisms that allow metal plating to form on a rechargeable battery's positive electrode as the battery discharges and that also allow the metal plating to go into solution as the battery charges. In some non-limiting implementations, the battery includes a secondary cell having a negative electrode compartment and a positive electrode compartment, which are separated by a sodium ion conductive electrolyte membrane. In some non-limiting implementations, a sodium metal negative electrode made is disposed in the negative electrode compartment. In this regard, as the cell discharges, the negative anode oxidizes to release sodium ions (e.g., $Na^+$). In contrast, as the cell is recharged the sodium ions are reduced to form the corresponding sodium metal.

The present invention provides a sodium-aluminum secondary cell (or rechargeable battery) that functions at a temperature between about 100° C. and about 200° C. While the described sodium-aluminum secondary cell can include any suitable component, in some non-limiting implementations, the cell includes a molten sodium metal negative electrode, a positive electrode compartment that includes an aluminum positive electrode disposed in a molten positive electrolyte, and a sodium ion conductive electrolyte membrane that physically separates the negative electrode from the positive electrode solution.

Generally, the sodium negative electrode comprises an amount of sodium metal. In this regard, as the cell operates, the sodium negative electrode is in a liquid or molten state. While the sodium negative electrode may comprise any suitable type of sodium, including without limitation, a pure sample of sodium or a sodium alloy, in some non-limiting implementations, the negative electrode comprises a sodium sample that is substantially pure.

The positive electrode in the positive electrode compartment comprises an amount of aluminum associated with a mixture of sodium halides and aluminum halides, represented by general formulas, NaX, $AlX_3$, $NaAlX_4$ and $NaAl_2X_7$, where X is a halogen atom or mixture of different halogen atoms selected from chlorine, bromine, and iodine. Aluminum halide compounds containing a mixture of different halogen atoms are presently preferred because they tend to possess a lower melting point compared to the corresponding aluminum halide compound containing only one type of halogen atom. A lower melting point is advantageous because it enables the cell to operate at lower temperatures.

The sodium ion conductive electrolyte membrane can comprise any membrane (which is used herein to refer to any suitable type of separator) that: selectively transports sodium ions, that is stable at the cell's operating temperature, that is stable when in contact with molten sodium and the positive electrode solution, and that otherwise allows the cell to function as intended. Indeed, in some non-limiting implementations, the electrolyte membrane comprises a ceramic NaSICON-type membrane.

Where the electrolyte membrane comprises a NaSICON-type membrane, the membrane can comprise any suitable kind of NaSICON-type membrane, including, without limitation, a composite NaSICON membrane. In this regard, and by way of non-limiting illustration, the membrane can comprise any known or novel composite NaSICON membrane that includes a dense NaSICON layer and a porous NaSICON layer, or a dense NaSICON layer with a cermet layer, such as a NiO/NaSICON cermet layer.

The described secondary cell may operate at any suitable operating temperature. The operating temperature is affected by the actual positive electrolyte composition. To assure the positive electrolyte is molten, the cell may be operated at least 10° C. above the melting point of the salt mixture forming the positive electrolyte composition. Indeed, in some non-limiting implementations, the cell functions (e.g., is discharged or recharged) at an operating temperature in the range from 100° C. to 200° C. The cell may function while the temperature of the cell is as high as a temperature selected from about 100° C., about 110° C., about 120° C., about 130° C., about 150° C., about 170° C., about 180° C., and about 200° C. Indeed, in some non-limiting implementations, the cell functions at a temperature between about 100° C. and about 150° C. In other embodiments, the cell functions at a temperature between about 100° C. and about 130° C. In yet other embodiments, however, as the cell functions, the temperature of the negative electrode is about 120° C.±about 10° C.

The described rechargeable molten sodium anode (negative electrode)-aluminum cathode (positive electrode) batteries have the advantage of low cost and higher safety due to low flammability of electrolytes and usage of sodium-ion conducting ceramic membrane. The development of low-cost rechargeable battery systems is a desirable advantage that could make renewable energy storage and Electric Vehicles an economic reality.

BRIEF DESCRIPTION OF THE SEVERAL DRAWINGS

In order that the manner in which the above-recited and other features and advantages of the invention are obtained and will be readily understood, a more particular description of the invention briefly described above will be rendered by reference to specific embodiments thereof that are illustrated in the appended drawings. Understanding that the drawings are not made to scale, depict only some representative embodiments of the invention, and are not therefore to be considered to be limiting of its scope, the invention will be described and explained with additional specificity and detail through the use of the accompanying drawings in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment. Additionally, while the following description refers to several embodiments and examples of the various components and aspects of the described invention, all of the described embodiments and examples are to be considered, in all respects, as illustrative only and not as being limiting in any manner.

Furthermore, the described features, structures, or characteristics of the invention may be combined in any suitable manner in one or more embodiments. In the following description, numerous specific details are provided, such as examples of suitable sodium negative electrodes, positive electrode materials, sodium ion conductive electrolyte membrane, etc., to provide a thorough understanding of embodiments of the invention. One having ordinary skill in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

As stated above, secondary cells can be discharged and recharged and this specification describes cell arrangements and methods for both states. Although the term "recharging" in its various forms implies a second charging, one of skill in the art will understand that discussions regarding recharging would be valid for, and applicable to, the first or initial charge, and vice versa. Thus, for the purposes of this specification, the terms "recharge," "recharged" and "rechargeable" shall be interchangeable with the terms "charge," "charged" and "chargeable" respectively.

Figure 1:
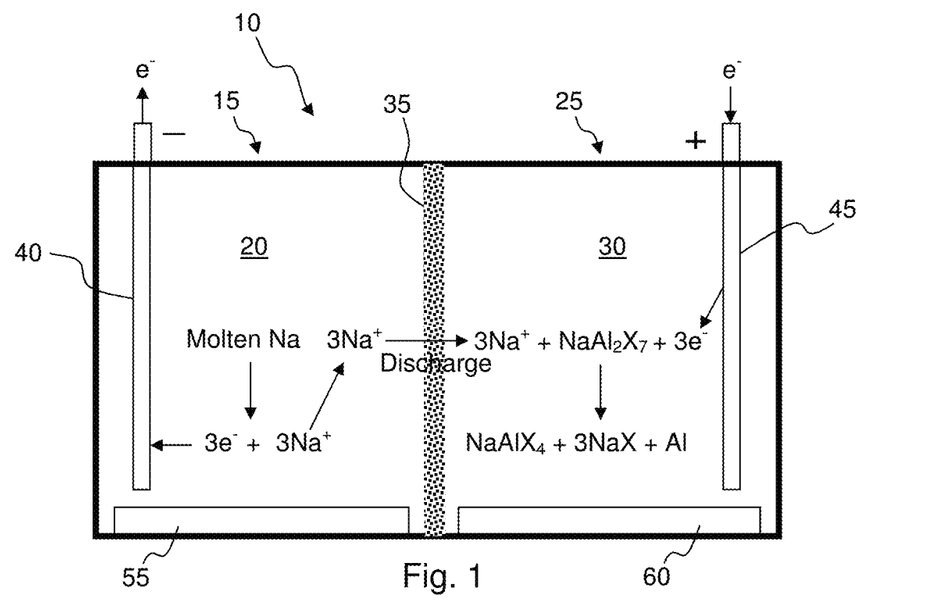
FIG. 1 depicts a schematic diagram of a representative embodiment of a sodium-aluminum secondary cell, wherein the cell is in the process of being discharged.

The disclosed invention provides systems and methods for providing battery charge transfer mechanisms that allow metal plating to form on a positive electrode in a rechargeable battery as the battery discharges, and that further allow the metal plating to oxidize and go into solution as the battery charges. The disclosed invention provides a sodium-aluminum secondary cell that functions at an operating temperature between about 100° C. and about 200° C. While the described cell can comprise any suitable component, FIG. 1 shows a representative embodiment in which the sodium-aluminum secondary cell 10 comprises an negative electrode compartment 15 that includes a metal sodium negative electrode 20, a positive electrode compartment 25 that comprises a positive electrolyte 30 that serves as the active source of aluminum ions and conducts sodium ions. A sodium ion conductive electrolyte membrane 35 separates the negative electrode 20 from the positive electrolyte 30 and separates a negative current collector 40 from a positive current collector 50. To provide a better understanding of the described cell 10, a brief description of how the cell functions is provided below. Following this discussion, each of the cell's components shown in FIG. 1 is discussed in more detail.

Turning now to the manner in which the molten sodium secondary cell 10 functions, the cell can function in virtually any suitable manner. In one example, FIG. 1 illustrates that as the cell 10 is discharged and electrons (e⁻) flow from the negative electrode 20 (e.g., via the negative current collector 40), sodium is oxidized from the negative electrode 20 to form sodium ions (Na⁺). FIG. 1 shows that these sodium ions are respectively transported from the sodium negative electrode 20, through the sodium ion conductive membrane 35, and to the positive electrolyte 30.

Figure 2:
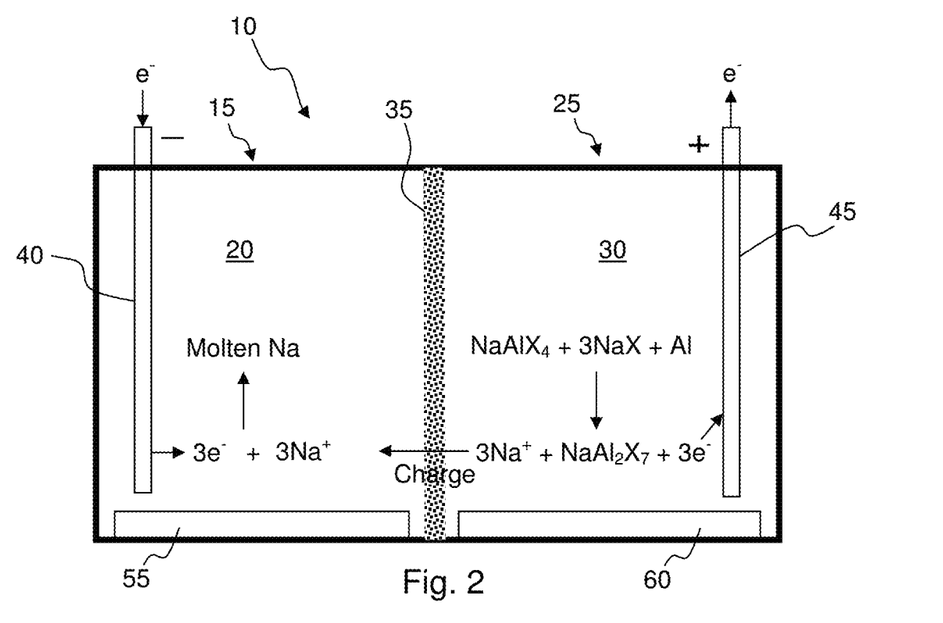
FIG. 2 depicts a schematic diagram of a representative embodiment of the sodium-aluminum secondary cell, wherein the cell is in the process of being recharged.

In a contrasting example, FIG. 2 shows that as the secondary cell 10 is recharged and electrons (e⁻) flow into the sodium negative electrode 20 from an external power source (not shown), such as a recharger, the chemical reactions that occur when the cell 10 is discharged (as shown in FIG. 1) are reversed. Specifically, FIG. 2 shows that as the cell 10 is recharged, sodium ions (Na⁺) are respectively transported from the positive electrolyte 30, through the electrolyte membrane 35, and to the negative electrode 20, where the sodium ions are reduced to form sodium metal (Na).

Referring now to the various components of the cell 10, the cell, as mentioned above, can comprise a negative electrode compartment 15 and a positive electrode compartment 25. In this regard, the two compartments can be any suitable shape and have any other suitable characteristic that allows the cell 10 to function as intended. By way of example, the negative electrode and the positive electrode compartments can be tubular, rectangular, or be any other suitable shape. Furthermore, the two compartments can have any suitable spatial relationship with respect to each other. For instance, while FIG. 2 shows that the negative electrode compartment 15 and the positive electrode compartment 25 can be adjacent to each other, in other embodiments, such as the embodiment shown in FIG. 3, one compartment (e.g., the negative electrode compartment) is disposed, at least partially, in the other compartment (e.g., the positive electrode compartment), while the contents of the two compartments remain separated by the electrolyte membrane 35 and any other compartmental walls.

With respect to the negative electrode 20, the cell 10 can comprise any suitable sodium negative electrode 20 that allows the cell 10 to function (e.g., be discharged and recharged) as intended. Some examples of suitable sodium negative electrode materials include, but are not limited to, a sodium sample that is substantially pure and a sodium alloy comprising any other suitable sodium-containing negative electrode material. In certain embodiments, however, the negative electrode comprises or consists of an amount of sodium that is substantially pure. In such embodiments, because the melting point of pure sodium is around 98° C., the sodium negative electrode will become molten above that temperature.

The positive electrolyte 30 contains an active source of aluminum and aluminum ions that function as the positive electrode. The cell 10 can comprise any suitable positive electrolyte 30 and current collector 45 that allows the cell to be charged and discharged as intended. For instance, the positive current collector 45 can comprise virtually any material or configuration has been successfully used in a sodium-based rechargeable battery system. In some embodiments, the positive current collector 45 is a wire, felt, plate, tube, mesh, foam, and/or other suitable current collector configuration.

In some non-limiting embodiments, the positive electrolyte 30 comprises a mixture of $NaAl_2X_7$ and $NaAlX_4$, where X is a halogen atom or mixture of different halogen atoms selected from chlorine, bromine, and iodine, and the negative electrode 20 comprises sodium.

In one non-limiting example, the aluminum halides include $NaAlCl_4$ and $NaAl_2Cl_7$. The $NaAlCl_4$ and $NaAl_2Cl_7$ is a eutectic mixture that melts in the temperature range of about 130 to 180° C., depending on the composition of the mix. $NaAlCl_4$ is formed by the reaction of NaCl and $AlCl_3$, as follows: $NaCl + AlCl_3 \rightarrow NaAlCl_4$.

A 1:1 molar mixture of $NaCl:AlCl_3$ melts at about 152° C. and is termed as neutral composition. Adding excess NaCl to the neutral mixture will result in two-phase mixture with solid NaCl and the liquid phase $NaAlCl_4$ above 152° C. $NaAl_2Cl_7$ (made of 1:2 mole ratio of $NaCl:AlCl_3$) melts at 140° C. and other acidic melts with $NaCl:AlCl_3$ molar ratio in the range of 1:1 to 1:3 melt in the range of 110 to 185° C.

It will be appreciated that analogous aluminum halide compounds may be prepared using different sodium halide or aluminum halide compounds. For example, using sodium iodide instead of sodium chloride yields the following: $NaI + AlCl_3 \rightarrow NaAlCl_3I$. $NaAlCl_3I$ melts at approximately 95° C.

A distinct advantage of having a mixture of different halides is that the sodium aluminum halide compounds containing mixtures of different halides are characterized by a lower melting point compared to sodium aluminum halide compounds containing a single halide species. Table 1, below, sets forth approximate melting point data for blends of $NaX:AlX_3$.

TABLE 1

Melting Points (° C.) for Sodium Halides with Aluminum Trihalides

| | $AlCl_3$ | $AlBr_3$ | $AlI_3$ |
|---|---|---|---|
| NaCl | 152 | 155 | 175 |
| NaBr | 150 | 200 | 195 |
| NaI | 95 | 160 | 235 |

For example, the 1:1 ratio of NaCl and $AlCl_3$ ($NaAlCl_4$) has a melting point of about 152° C., whereas the 1:1 ratio of NaI and $AlCl_3$ ($NaAlCl_3I$) has a melting point of about 95° C. Thus, if a mixture of NaI and $AlCl_3$ is used in the sodium-aluminum battery, it may be operated at a lower temperature compared to a battery using just NaCl and $AlCl_3$. Similarly, a 50:50 ratio of $NaAlCl_4$:$NaAlBr_4$ or 60:40 $NaAlCl_3I$:$NaAlBr_3Cl$ have lower melting points than the individual components. For example, $LiAlCl_4$ melts at nearly 150° C. $LiAlI_4$ melts around 240° C. But a 70:30 $LiAlCl_4$:$LiAlI_4$ mixture melts at 65° C. Similar melting point depression may be expected for sodium salts. Thus, it is desirable for the sodium aluminum halide positive electrolyte composition to include sodium and aluminum halide compounds containing at least two different halides.

The reaction that may occur at the negative electrode as the cell 10 is discharged is illustrated below:

$$Na \rightarrow Na^+ + 1e^- \quad (-2.71V) \quad (1)$$

The reactions that may occur at the positive electrode as the cell 10 is discharged are illustrated below:

$$NaAlCl_4(basic) + 3Na^+ + 3e^- \rightarrow Al + 4NaCl \text{ (1.8V vs. Na)} \quad (2)$$

$$NaAl_2Cl_7(acidic) + 3Na^+ + 3e^- \rightarrow Al + 3NaCl + NaAlCl_4 \text{ (2.16 V vs. Na)} \quad (3)$$

Reaction 2 will be favored when excess NaCl is present in the positive electrode compared to $AlCl_3$ and reaction 3 is favored when excess $AlCl_3$ is present in the positive electrode compared to NaCl.

The overall reactions that may occur as the cell 10 is discharged may occur as illustrated below:

$$3Na + NaAlCl_4(basic) \rightarrow Al + 4NaCl \text{ (1.8V)} \quad (4)$$

$$3Na + NaAl_2Cl_7(acidic) \rightarrow Al + 3NaCl + NaAlCl_4 \text{ (2.16 V)} \quad (5)$$

Accordingly, some embodiments of the described cell 10, at least theoretically, are capable of producing about 2.16V at standard temperature and pressure.

The reaction that may occur at the negative electrode as the cell 10 is recharged is illustrated below:

$$Na^+ + 1e^- \rightarrow Na \quad (6)$$

The reactions that may occur at the positive electrode as the cell 10 is recharged are illustrated below:

$$Al + 4NaCl \rightarrow NaAlCl_4(basic) + 3Na^+ + 3e^- \quad (7)$$

$$Al + 3NaCl + NaAlCl_4 \rightarrow NaAl_2Cl_7(acidic) + 3Na^+ + 3e^- \quad (8)$$

The cell recharge reactions that may occur at the positive electrode when NaI replaces NaCl in the positive electrolyte are illustrated below:

$$Al + 3NaCl + NaI \rightarrow NaAlCl_3I(basic) + 3Na^+ + 3e^- \quad (7a)$$

$$Al + 3NaCl + NaAlCl_3I \rightarrow NaAl_2Cl_6I(acidic) + 3Na^+ + 3e^- \quad (8a)$$

$$Al + 2NaCl + NaI + NaAlCl_4 \rightarrow NaAl_2Cl_6I(acidic) + 3Na^+ + 3e^- \quad (8b)$$

The overall reactions that may occur as the cell 10 is recharged may occur as illustrated below:

$$Al + 4NaCl \rightarrow 3Na + NaAlCl_4(basic) \quad (9)$$

$$Al + 3NaCl + NaAlCl_4 \rightarrow 3Na + NaAl_2Cl_7(acidic) \quad (10)$$

Similar cell reactions occur at the positive electrode when NaI replaces NaCl in the positive electrolyte. The following are typical cell discharge reactions that may occur at the positive electrode when NaI replaces NaCl in the positive electrolyte:

$$NaAlCl_3I(basic) + 3Na^+ + 3e^- \rightarrow Al + 3NaCl + NaI \text{ (1.8V vs. Na)} \quad (2a)$$

$$NaAl_2Cl_6I(acidic) + 3Na^+ + 3e^- \rightarrow Al + 3NaCl + NaAlCl_3I \text{ (2.16V vs. Na)} \quad (3a)$$

$$NaAl_2Cl_6I(acidic) + 3Na^+ + 3e^- \rightarrow Al + NaI + 2NaCl + NaAlCl_4 \text{ (2.16V vs. Na)} \quad (3b)$$

Reaction 2a is favored when excess NaI is present in the positive electrode compared to $AlCl_3$ and reactions 3a and 3b are favored when excess $AlCl_3$ is present in the positive electrode compared to NaI.

The overall reactions that may occur as the cell 10 is discharged may occur as illustrated below:

$$NaAlCl_3I(basic) + 3Na \rightarrow Al + 3NaCl + NaI \text{ (1.8V)} \quad (4a)$$

$$NaAl_2Cl_6I(acidic) + 3Na \rightarrow Al + 3NaCl + NaAlCl_3I \text{ (2.16V)} \quad (5a)$$

$$NaAl_2Cl_6I(acidic) + 3Na \rightarrow Al + NaI + 2NaCl + NaAlCl_4 \text{ (2.16V)} \quad (5b)$$

Accordingly, some embodiments of the described cell 10, at least theoretically, are capable of producing about 2.16V at standard temperature and pressure.

The cell recharge reactions that may occur at the positive electrode when NaI replaces NaCl in the positive electrolyte are illustrated below:

$$Al + 3NaCl + NaI \rightarrow NaAlCl_3I(basic) + 3Na^+ + 3e^- \quad (7a)$$

$$Al + 3NaCl + NaAlCl_3I \rightarrow NaAl_2Cl_6I(acidic) + 3Na^+ + 3e^- \quad (8a)$$

$$Al + 2NaCl + NaI + NaAlCl_4 \rightarrow NaAl_2Cl_6I(acidic) + 3Na^+ + 3e^- \quad (8b)$$

The overall reactions that may occur as the cell 10 is recharged may occur as illustrated below:

$$Al + 3NaCl + NaI \rightarrow NaAlCl_3I(basic) + 3Na \quad (9a)$$

$$Al + 3NaCl + NaAlCl_3I \rightarrow NaAl_2Cl_6I(acidic) + 3Na \quad (10a)$$

$$Al + 2NaCl + NaI + NaAlCl_4 \rightarrow NaAl_2Cl_6I(acidic) + 3Na \quad (10b)$$

The voltages shown in parentheses in the foregoing cell discharge reactions is the expected open circuit voltage (OCV) based upon the cyclic voltammetry (CV) analysis reported in Examples 3 and 4. The OCV may change slightly depending on the actual state of charge and depending upon the positive electrolyte salt mix composition. It is expected that the OCV may range ±0.2 V from the reported values. The operating potential will be different and will be dependent upon the current density. The cell could be operating at a lower voltage, such as 1V or less, if the current density is high enough. Also, at high current density the local region around an electrode in an acidic melt can become basic and would cause a further drop in the operating potential.

With regards now to the sodium ion conductive electrolyte membrane 35, the membrane can comprise any suitable material that selectively transports sodium ions and permits the cell 10 to function with a non-aqueous positive electrolyte. In some embodiments, the electrolyte membrane comprises a NaSICON-type (sodium Super Ion CONductive) material. In such embodiments, the NaSICON-type material may comprise any known or novel NaSICON-type material that is suitable for use with the described cell 10. Some suitable examples of NaSICON-type compositions include, but are not limited to, $Na_3Zr_2Si_2PO_{12}$, $Na_{1+x}Si_xZr_2P_{3-x}O_{12}$ (where x is selected from 1.6 to 2.4), Y-doped NaSICON ($Na_{1+x+y}Zr_{2-y}Y_ySi_xP_{3-x}O_{12}$, $Na_{1+x}Zr_{2-y}Y_y$ $Si_xP_{3-x}O_{12-y}$ (where x=2, y=0.12), and Fe-doped NaSICON ($Na_3Zr_{2/3}Fe_{4/3}P_3O_{12}$). Indeed, in certain embodiments, the NaSICON-type membrane comprises $Na_3Si_2Zr_2PO_{12}$. In still other embodiments, the NaSICON-type membrane comprises known or novel composite, cermet-supported NaSICON membrane. In such embodiments, the composite NaSICON membrane can comprise any suitable component, including, without limitation, a porous NaSICON-cermet layer that comprises NiO/NaSICON or any other suitable cermet layer, and a dense NaSICON layer. In yet other embodiments, the NaSICON membrane comprises a monoclinic ceramic.

Where the cell's electrolyte membrane 35 comprises a NaSICON-type material, the NaSICON-type material may provide the cell 10 with several beneficial characteristics. In one example, because NaSICON-type materials, as opposed to a sodium β"-alumina ceramic electrolyte separator, are substantially impermeable to, and stable in the presence of, water, NaSICON-type materials can allow the cell to include a positive electrode solution, such as an aqueous positive electrode solution, that would otherwise be incompatible with the sodium negative electrode 20. Thus, the use of a NaSICON-type membrane as the electrolyte membrane can allow the cell to have a wide range of battery chemistries. As another example of a beneficial characteristic that can be associated with NaSICON-type membranes, because such membranes selectively transport sodium ions but do not allow the negative electrode 20 and the positive electrolyte 30 to mix, such membranes can help the cell to have minimal capacity fade and to have a relatively stable shelf life at ambient temperatures.

With reference now to the current collectors 40 and 45, the current collectors may be electrically coupled to respective terminals that are capable of electrically connecting the cell with an external circuit, including without limitation, to one or more cells. In this regard, the terminals can comprise any suitable material and any suitable shape of any suitable size.

In addition to the aforementioned components, the cell 10 can optionally comprise any other suitable component. By way of non-limiting illustration FIG. 2 shows an embodiment in which the cell 10 comprises a heat management system 55, 60. In such embodiments, the cell can comprise any suitable type of heat management system that is capable of maintaining the cell within a suitable operating temperature range. Some examples of such heat management systems include, but are not limited to, a heater, a cooler, one or more temperature sensors, and appropriate temperature control circuitry. A separate heat management system 55, 60 may be provided for the negative electrode compartment and for the positive electrode compartment. In this manner, it is possible to operate the cell where each compartment operates at a favorable operating temperature. For example, the positive electrolyte may melt at a higher temperature comparted to sodium. In such cases, it may be more efficient to operate the positive electrode compartment at a different or higher temperature compared to the negative electrode compartment. Alternatively, the cell may be operated with a single heat management system to control the temperature for both cell compartments.

The described cell 10 may function at any suitable operating temperature. In other words, as the cell is discharged and/or recharged, the sodium negative electrode may have any suitable temperature such that it is molten and the positive electrode may have any suitable temperature such that it is molten. The operating temperature of the negative electrode and positive electrode may be the same or different. The effective operating temperature is affected by the actual positive electrolyte composition. To assure the positive electrolyte is molten, the positive electrode may be operated at least 10° C. above the melting point of the salt mixture forming the positive electrolyte composition. Indeed, in some embodiments, the cell functions at an operating temperature in the range from 100° C. to 200° C. The cell may function at an operating temperature that is as high as a temperature selected from about 110° C., about 120° C., about 130° C., about 150° C., about 170° C., about 180° C., and about 200° C. Moreover, in such embodiments, as the cell functions, the temperature of the negative electrode can be as low as a temperature selected from about 120° C., about 115° C., about 110° C., and about 100° C. Indeed, in some embodiments, the cell functions at a temperature between about 100° C. and about 150° C. In other embodiments, the cell functions at a temperature between about 100° C. and about 130° C. In yet other embodiments, however, as the cell functions, the temperature of the negative electrode is about 120° C.±about 10° C.

In addition to the aforementioned benefits of the cell 10, the described cell may have several other beneficial characteristics. By way of example, by being able to operate in a temperature range between about 100° C. and about 150° C., the cell 10 may operate in a temperature range that is significantly lower the operating temperature of certain conventional molten sodium rechargeable batteries. Accordingly, the described cell may require less energy to heat and/or dissipate heat from the cell as the cell functions, may be less dangerous use or handle, and may be more environmentally friendly.

The following examples are given to illustrate various embodiments within, and aspects of, the scope of the present invention. These are given by way of example only, and it is understood that the following examples are not comprehensive or exhaustive of the many types of embodiments of the present invention that can be prepared in accordance with the present invention.

Example 1

Figure 3:
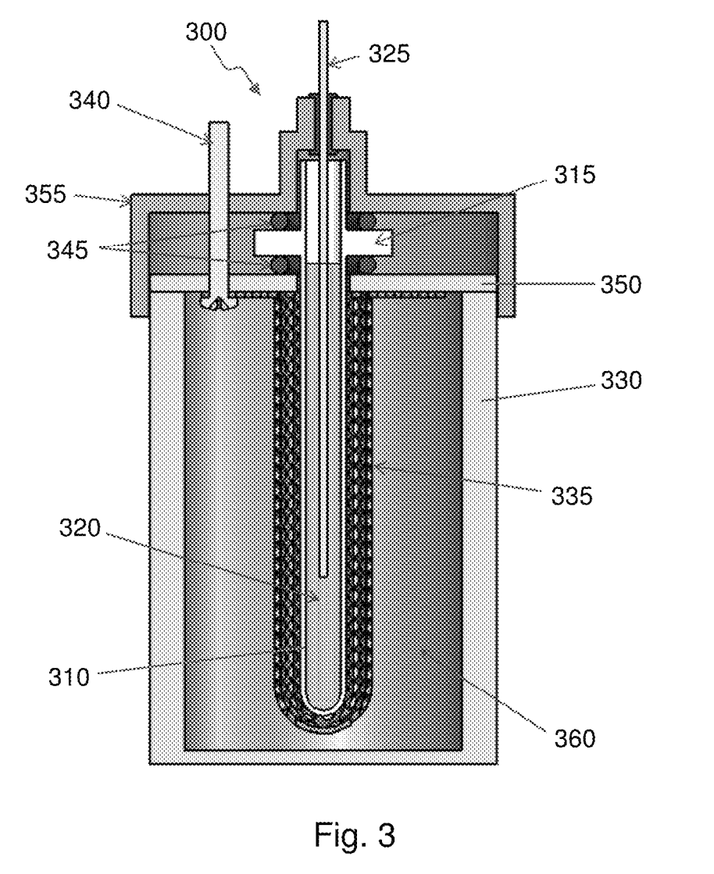
FIG. 3 depicts a diagrammatic representation of a design of a sodium-aluminum secondary cell as disclosed herein.

One possible design of the sodium-aluminum cell 300 is shown in FIG. 3. The details of construction of the cell are as follows: A NaSICON (Na Super Ionic Conductor) solid electrolyte membrane 310 is glass sealed to an alumina flange header 315 with upper and lower Ni rings. The NaSICON tube is filled with sodium metal (negative electrode) 320 in molten state. A negative current collector 325 in the form of a stainless steel or Ni or Mo rod is immersed in the sodium metal to provide electrical contact. The NaSICON tube is placed inside an outer can 330 made of steel, aluminum, copper, or other suitable material. An optional positive current collector mesh 335 is positioned inside the can 330 adjacent to the NaSICON membrane 310 and is electrically connected to a positive terminal 340. The alumina flange 315 is sealed with two O-rings 345 between the top wall 350 of the container and a metal cap 355 to make a tight seal around the tube to hang it and hold it in space within the outer can 330.

A mixture of $NaAl_2Cl_7$ and $NaAlCl_4$ positive electrolyte 360 is placed in the outer can 330. This electrolyte serves not only as the active source of Al ions but also conducts sodium ions from the solid NaSICON electrolyte tube 310 to the positive current collector mesh 335 where Al deposition/stripping occurs according to reactions (2), (3), (7), and (8), above. The mixture of $NaAl_2Cl_7$ and $NaAlCl_4$ positive electrolyte is a eutectic mixture and melts in the temperature range of 108° C. and 192° C. depending on the composition of the mix.

The Open Circuit Voltage (OCV) of the present Na—Al cell is about 1.8V to 2.16V (dependent on whether the catholyte is basic or acidic) and the theoretical specific energy is 373.5 Wh/kg. Based on the report of high reversibility of the Al electrode and well known high reversibility of the Na electrode, the present Na—Al battery is expected to be capable of charging/discharging at high current rates.

Example 2

A sodium-aluminum cell is prepared according to Example 1, except that the positive electrolyte comprises a mixture of $NaAl_2Cl_6I$ and $NaAlCl_3I$. This electrolyte serves not only as the active source of Al ions but also conducts sodium ions from the solid NaSICON electrolyte tube to the positive current collector mesh where Al deposition/stripping occurs according to reactions (2a), (3a), (3b), (7a), (8a) and (8b), above. The mixture of $NaAl_2Cl_6I$ and $NaAlCl_3I$ positive electrolyte is a eutectic mixture and melts in the temperature range of 108° C. and 192° C. depending on the composition of the mix.

The OCV of the present Na—Al cell is about 1.8V to 2.16V (dependent on whether the catholyte is basic or acidic) and the theoretical specific energy is 373.5 Wh/kg. Based on the report of high reversibility of the Al electrode and well known high reversibility of the Na electrode, the present Na—Al battery is expected to be capable of charging/discharging at high current rates.

Example 3

Cyclic voltammetry (CV) analysis of a 40:60 $NaI:AlCl_3$ (Acidic) electrolyte was performed to study the electrochemical properties of the electrolyte. 12.86 g of NaI was added to 17.14 g of anhydrous $AlCl_3$ in a 50 mL glass jar and heated to 124° C. on a hotplate within a drybox filled with nitrogen. A lid was constructed to hold three electrodes. The working electrode and counter electrode were made of graphite felt. The Na reference electrode consisted of a NaSICON tube filled with Na metal. A potentiostat was used to create a cyclic voltammogram between 2.0V and 3.0V vs Na using a scan rate of 10 mV/s. The current of the working electrode was plotted versus the applied voltage, that is, the working electrode's potential and shown in FIG. 4.

Figure 4:
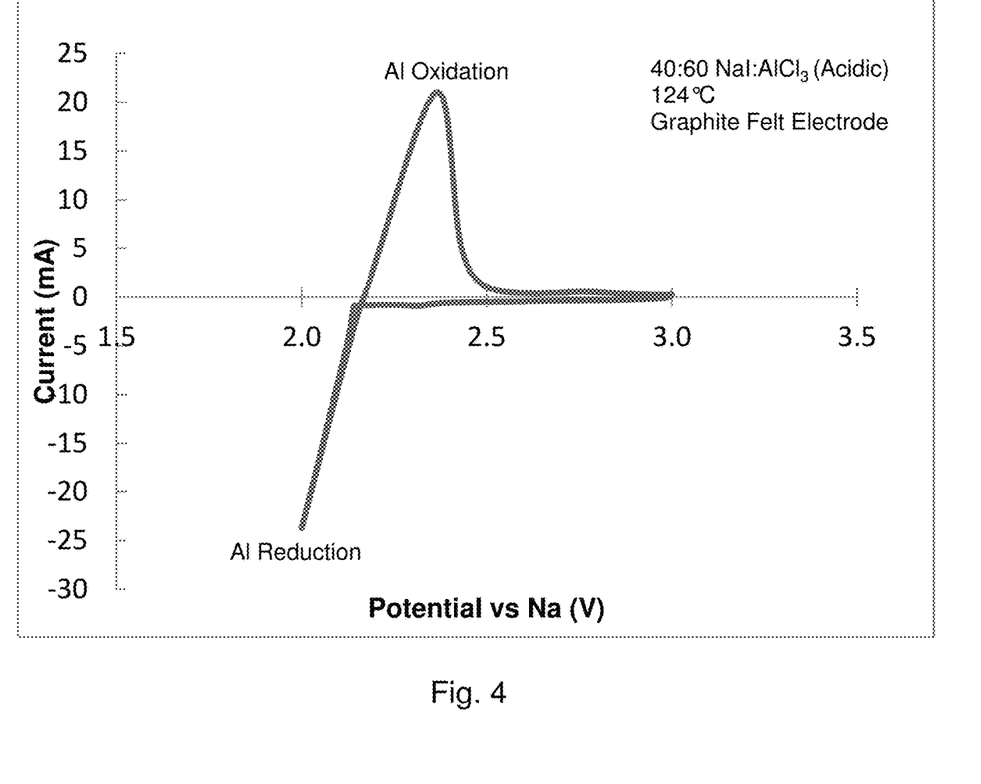
FIG. 4 is a graph of current vs. voltage for aluminum plating in an acidic (40:60 $NaI:AlCl_3$) electrolyte medium at 124° C.

FIG. 4 shows that as the working electrode was made more cathodic a negative peak associated with aluminum plating started at 2.16 V. When the voltage was reversed then a positive peak associated with aluminum stripping from the electrode started at 2.18 V. No other electrochemical reactions were observed between 2.16V and 3V.

Example 4

Cyclic voltammetry (CV) analysis of a 60:40 $NaI:AlCl_3$ (Basic) electrolyte was performed to study the electrochemical properties of the electrolyte. 18.84 g of NaI was added to 11.16 g of anhydrous $AlCl_3$ in a 50 mL glass jar and heated to 134° C. on a hotplate within a drybox filled with nitrogen. Some of the NaI remained as a solid. The same lid with three electrodes described in Example 2 was used. The working electrode and counter electrode were made of graphite felt. The Na reference electrode consisted of a NaSICON tube filled with Na metal. A potentiostat was used to measure a cyclic voltammogram between 1.7V and 3.15V vs Na using a scan rate of 10 mV/s. The current of the working electrode was plotted versus the applied voltage, that is, the working electrode's potential and shown in FIG. 5.

Figure 5:
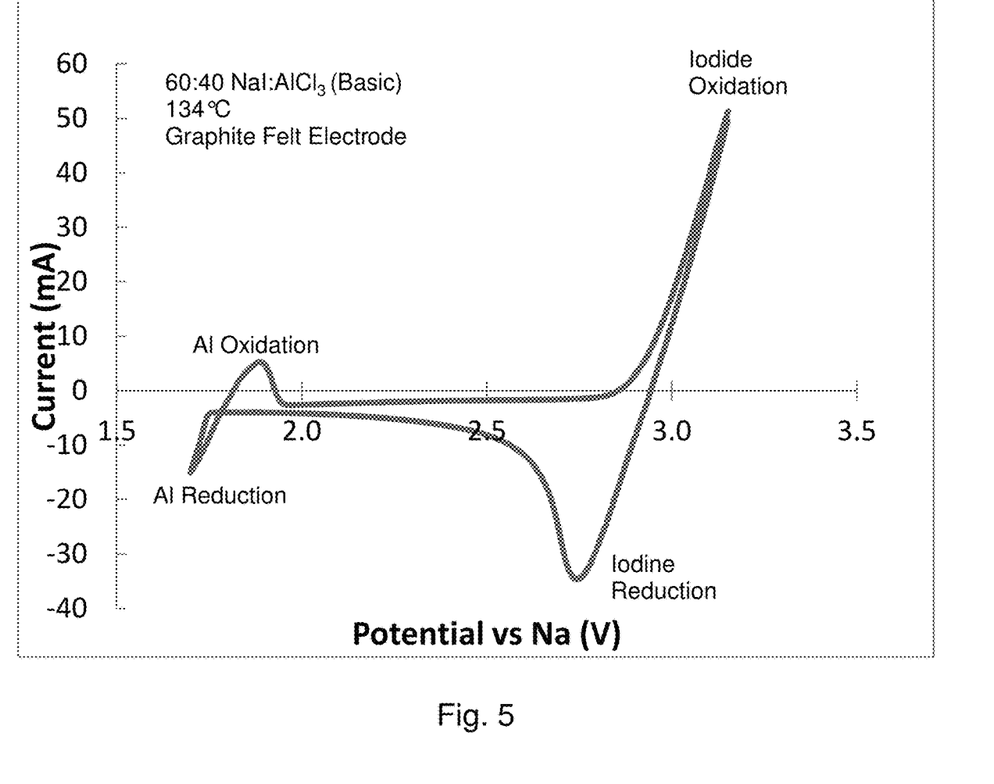
FIG. 5 is a graph of current vs. voltage for aluminum plating in a basic (60:40 $NaI:AlCl_3$) electrolyte medium at 134° C.

FIG. 5 shows that as the working electrode was made more cathodic a negative peak associated with aluminum plating started at 1.75 V. When the voltage was reversed then a positive peak associated with aluminum stripping from the electrode started at 1.8 V. As the working electrode was made even more positive than a second peak started at 2.86V. This peak is associated with iodine formation. The negative peak starting at 2.95V is associated with the reduction of iodine to iodide.

While specific embodiments and examples of the present invention have been illustrated and described, numerous modifications come to mind without significantly departing from the spirit of the invention, and the scope of protection is only limited by the scope of the accompanying claims.

The invention claimed is:

1. A sodium-aluminum secondary cell, comprising:
   a metal sodium negative electrode, which electrochemically oxidizes to release sodium ions during discharge and electrochemically reduces sodium ions to sodium metal during recharging;
   a positive electrode compartment comprising an aluminum positive electrode disposed in a positive electrolyte comprising a mixture of $NaAl_2X_7$ and $NaAlX_4$, wherein:
     X is a halogen atom or mixture of different halogen atoms selected from chlorine, bromine, and iodine; and
     the $NaAl_2X_7$, $NaAlX_4$, or both $NaAl_2X_7$ and $NaAlX_4$ are reduced to form aluminum during discharge; and
   a sodium ion conductive electrolyte membrane that comprises a NaSICON-type material and separates the metal sodium negative electrode from the positive electrolyte,
   wherein the metal sodium negative electrode and the positive electrolyte are molten and in contact with the conductive electrolyte membrane as the cell operates, and wherein the cell functions at an operating temperature between about 100° C. and about 200° C.

2. The cell of claim 1, wherein the NaSICON-type material comprises a composite membrane having a porous layer and a dense functional layer.

3. The cell of claim 1, wherein the cell functions when the operating temperature is between about 100° C. and about 150° C.

4. The cell of claim 1, wherein the following reaction occurs at the positive electrode as the cell is discharged: $NaAl_2Cl_7+3Na^++3e^-\rightarrow Al+3NaCl+NaAlCl_4$.

5. The cell of claim 1, wherein the following reaction occurs at the positive electrode as the cell is discharged: $NaAlCl_4+3Na^++3e^-\rightarrow Al+4NaCl$.

6. The cell of claim 1, wherein the one or both of the following reactions occurs at the positive electrode as the cell is discharged: $NaAl_2Cl_6I+3Na^++3e^-\rightarrow Al+3NaCl+NaAlCl_3I$, $NaAlCl_6I+3Na^++3e^-\rightarrow Al+NaI+2NaCl+NaAlCl_4$.

7. The cell of claim 1, wherein the following reaction occurs at the positive electrode as the cell is discharged: $NaAlCl_3I+3Na^++3e^-\rightarrow Al+3NaCl+NaI$.

8. The cell of claim 1, wherein the positive electrolyte comprises $NaAlCl_3I$.

9. The cell of claim 1, wherein the positive electrolyte comprises $NaAl_2Cl_6I$.

10. A method for providing electrical potential from a sodium-aluminum secondary cell, the method comprising:
providing a molten sodium secondary cell, comprising:
a metal sodium negative electrode, which electrochemically oxidizes to release sodium ions during discharge and electrochemically reduces sodium ions to sodium metal during recharging;
a positive electrode system comprising an aluminum positive electrode disposed in a positive electrolyte comprising a mixture of $NaAl_2X_7$ and $NaAlX_4$, where X is a halogen atom or mixture of different halogen atoms selected from chlorine, bromine, and iodine; and
a sodium ion conductive electrolyte membrane that comprises a NaSICON-type material and separates the metal sodium negative electrode from the positive electrolyte; and
heating the metal sodium negative electrode to a temperature between about 100° C. and about 200° C. so that the metal sodium negative electrode is molten and in contact with the sodium ion conductive electrolyte membrane and so that the positive electrolyte is molten and in contact with the sodium ion conductive electrolyte membrane, such that the metal sodium negative electrode oxidizes to release the sodium ions and such that the $NaAl_2X_7$, $NaAlX_4$, or both $NaAl_2X_7$ and $NaAlX_4$ are reduced to form aluminum, thereby allowing the cell to discharge electricity.

11. The method of claim 10, further comprising maintaining the temperature of the metal sodium negative electrode between about 110° C. and about 130° C.

12. The method of claim 10, further comprising maintaining the temperature of the positive electrolyte at an operating temperature between about 110° C. and about 180° C.

13. The method of claim 10, further comprising maintaining the temperature of the positive electrolyte at an operating temperature between about 110° C. and about 150° C.

14. The method of claim 10, further comprising recharging the cell by passing an electrical potential between the sodium metal negative electrode and the positive electrode to cause the sodium negative electrode to electrochemically reduce sodium ions to sodium metal.

15. The method of claim 1, wherein the one or both of the following reactions occurs at the positive electrode as the cell is discharged: $NaAl_2Cl_6I+3Na^++3e^-\rightarrow Al+3NaCl+NaAlCl_3I$, $NaAl_2Cl_6I+3Na^++3e^-\rightarrow Al+NaI+2NaCl+NaAlCl_4$.

16. The method of claim 1, wherein the following reaction occurs at the positive electrode as the cell is discharged: $NaAlCl_{3+3}Na^++3e^-\rightarrow Al+3NaCl+NaI$.

17. The method of claim 1, wherein the positive electrolyte comprises $NaAlCl_3I$.

18. The method of claim 1, wherein the positive electrolyte comprises $NaAl_2Cl_6I$.

* * * * *

UNITED STATES PATENT AND TRADEMARK OFFICE
CERTIFICATE OF CORRECTION

PATENT NO. : 10,734,686 B2
APPLICATION NO. : 15/130741
DATED : August 4, 2020
INVENTOR(S) : Mathew Robins et al.

Page 1 of 1

It is certified that error appears in the above-identified patent and that said Letters Patent is hereby corrected as shown below:

In the Claims

Column 13, Claim 6, Line 2 delete "($NaAlCl_6I$ )" and insert -- ($NaAl_2Cl_6I$) --.

Column 14, Claim 15, Line 22 delete "(claim 1)" and insert -- (claim 10) --.

Column 14, Claim 16, Line 27 delete "(claim 1)" and insert -- (claim 10) --.

Column 14, Claim 16, Line 28 delete "($NaAlCl_{3+3}Na^+$)" and insert -- ($NaAlCl_3I + 3Na^+$) --.

Column 14, Claim 17, Line 29 delete "(claim 1)" and insert -- (claim 10) --.

Column 14, Claim 18, Line 32 delete "(claim 1)" and insert -- (claim 10) --.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*